(12) United States Patent
Breiner et al.

(10) Patent No.: US 6,783,560 B2
(45) Date of Patent: Aug. 31, 2004

(54) PROCESS FOR PREPARING WETFAST POLYAMIDE FIBERS

(75) Inventors: Ulrike Breiner, Buerstadt (DE); Dean R. Gadoury, Lake Jackson, TX (US); Harry Y. Hu, Arden, NC (US); Theodore G. Karageorgiou, Arden, NC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/270,567

(22) Filed: Oct. 16, 2002

(65) Prior Publication Data

US 2003/0056304 A1 Mar. 27, 2003

Related U.S. Application Data

(62) Division of application No. 09/821,691, filed on Mar. 30, 2001, now Pat. No. 6,620,208.

(51) Int. Cl.[7] .................................................. D06P 3/06
(52) U.S. Cl. .................... 8/442; 8/443; 8/445; 8/490; 8/568; 8/594; 8/539; 8/673; 8/685; 8/920; 8/924; 528/310; 528/312; 528/313; 528/318
(58) Field of Search ................... 8/442, 443, 445, 8/490, 568, 594, 539, 673, 685, 924; 528/310, 312, 313, 318, 314

(56) References Cited

U.S. PATENT DOCUMENTS

| | | | |
|---|---|---|---|
| 2,904,536 A | 9/1959 | Reith ........................... 260/78 |
| 2,960,489 A | 11/1960 | Gabler et al. ............. 260/45.75 |
| 3,017,392 A | 1/1962 | Butler et al. .................. 260/78 |
| 3,093,618 A | 6/1963 | Graf et al. .................... 260/78 |
| 3,120,503 A | 2/1964 | Hedrick et al. ............... 260/78 |
| 3,206,418 A | 9/1965 | Giberson .................... 260/2.5 |
| 3,225,011 A | 12/1965 | Preston et al. ................ 260/78 |
| 3,249,590 A | 5/1966 | Pietrusza et al. ............. 260/78 |
| 3,251,799 A | 5/1966 | Pietrusza et al. ............. 260/37 |
| 3,366,608 A | 1/1968 | Lincoln et al. ................ 260/78 |
| 3,475,111 A | 10/1969 | Meyer et al. .................... 8/21 |
| 3,684,765 A | 8/1972 | Matsui et al. ............. 260/45.8 |
| 3,904,581 A | 9/1975 | Murayama et al. ........ 260/45.8 |
| 3,943,095 A | 3/1976 | Livingston ................ 260/45.7 |
| 4,088,629 A | 5/1978 | Uhrhan et al. ............. 260/45.5 |
| 4,153,596 A | 5/1979 | Oertel et al. ............... 260/45.8 |
| 4,166,813 A | 9/1979 | Soma et al. ............... 260/45.8 |
| 4,210,576 A | 7/1980 | Di Battista et al. ........ 260/45.8 |
| 4,223,147 A | 9/1980 | Oertel et al. ................ 546/224 |
| 4,233,410 A | 11/1980 | Rody et al. .................. 525/123 |
| 4,316,837 A | 2/1982 | Molt et al. ................. 260/45.8 |
| 4,366,306 A | 12/1982 | Smith ......................... 528/315 |
| 4,391,968 A | 7/1983 | Merani et al. .............. 528/318 |
| 4,395,508 A | 7/1983 | Nelli et al. .................. 524/103 |
| 4,530,950 A | 7/1985 | Raspanti et al. ............ 524/100 |
| 4,621,110 A | 11/1986 | Di Battista ................. 524/100 |
| 5,618,909 A | 4/1997 | Lofquist et al. ............. 528/310 |
| 5,684,120 A | 11/1997 | Torre .......................... 528/346 |
| 5,807,972 A | 9/1998 | Liedloff et al. ............. 528/346 |
| 5,810,890 A | 9/1998 | Russ et al. ...................... 8/531 |
| 5,814,107 A | 9/1998 | Gadoury et al. ............... 8/442 |
| 5,851,238 A | * 12/1998 | Gadoury et al. ............... 8/442 |

FOREIGN PATENT DOCUMENTS

| | | | |
|---|---|---|---|
| WO | WO 98/50610 | 11/1998 | ............ D01F/6/60 |
| WO | WO 99/41297 | 8/1999 | .......... C08G/69/00 |
| WO | WO 99/46323 | 9/1999 | ......... C08K/5/3435 |

* cited by examiner

*Primary Examiner*—Brian P. Mruk
*Assistant Examiner*—Eisa Elhilo
(74) *Attorney, Agent, or Firm*—Nixon & Vanderhye P.C.

(57) ABSTRACT

A modified polyamide polymer having a high amino end group content, with more than 30 percent of the amino end groups being secondary or tertiary amine, dramatically improves the dye bleed performance. The modified polyamide may be prepared by polymerization of polyamide-forming monomers in the presence of a carboxylic acid and a hindered piperidine derivative in amounts sufficient to achieve the high amino end group content.

3 Claims, 3 Drawing Sheets

PROCESS FOR PREPARING WETFAST POLYAMIDE FIBERS

This application is a division of application Ser. No. 09/821,691, filed Mar. 30, 2001, now U.S. Pat. No. 6,620,208, the entire content of which is hereby incorporated by reference in this application.

FIELD OF THE INVENTION

The present invention relates generally to a modified polyamide polymer having markedly improved wetfastness properties. In particular, the present invention relates to a modified polyamide 6 polymer for textile fiber that significantly reduces dye bleed performance in water and improves colorfastness to laundering.

BACKGROUND OF THE INVENTION

Polyamide (nylon) polymers such as, for example, polyamide 6 and polyamide 6,6 are commonly used in the production of fibers and yarns for elastic fabrics, especially swimwear. When textile fibers and yarns made of polyamide are used for elastic fabric applications, they exhibit a wetfastness problem.

It is known that stabilizers can be used to improve certain properties (i.e., light and heat stability) of some polyamide polymers. One such class of stabilizers is the hindered amine light stabilizer class, which includes compounds derived from polyalkylpiperidine. For example, polyamide 6 forming monomers may be polymerized in the presence of water, carboxylic acids, and hindered piperidine derivatives (polyalkylpiperidines) to form a modified polyamide polymer that is stabilized against heat and light degradation. Although the stabilizers do much to stabilize the polymer against heat and light, such additives themselves do little to stabilize the wetfastness of the polymer.

A need, therefore, exists for a wetfast polyamide polymer with resistance to dye bleeding in water, as well as colorfastness to laundering.

SUMMARY OF THE INVENTION

It is an object of the present invention to improve the wetfastness properties, particularly dye bleed performance and colorfastness to laundering, of polyamide 6.

It has now been found that this object may be achieved by polymerizing polyamide-forming monomers in the presence of a hindered piperidine derivative and a carboxylic acid as a chain regulator to obtain a modified polyamide polymer containing a high number of amino end groups. Most preferably, the hindered piperidine derivative and carboxylic acid are present in amounts sufficient to form a modified polyamide polymer having at least about 30 percent or greater of the amino end groups being secondary or tertiary amines.

The above and other objects, effects, features, and advantages of the present invention will become more apparent from the following detailed description of the preferred embodiments thereof.

BRIEF DESCRIPTION OF THE ACCOMPANYING DRAWINGS

Reference will hereinafter be made to the accompanying drawings, wherein.

DETAILED DESCRIPTION OF THE PREFERRED EMBODIMENTS

Figure 1A:
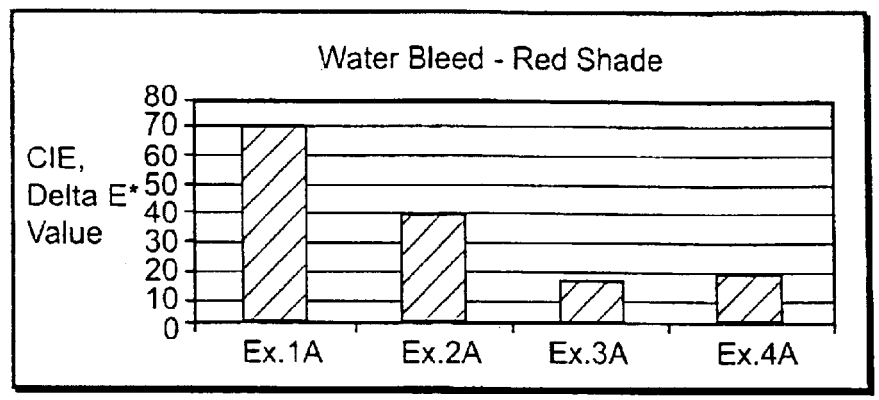
FIGS. 1A–1D are graphical presentations of the Water Bleed data obtained from the dyed samples of Examples 1A–4A, respectively.

To promote an understanding of the principles of the present invention, descriptions of specific embodiments of the invention follow, and specific language is used to describe the same. It will nevertheless be understood that no limitation of the scope of the invention is intended by the use of this specific language and that alterations, modifications, equivalents, and further applications of the principles of the invention discussed are contemplated as would normally occur to one of ordinary skill in the art to which the invention pertains.

Broadly, the present invention is embodied in polyamide polymers and method of making the same wherein the polyamide polymers have a high amino end group content which is comprised of the polyamide polymerization reaction product of polyamide-forming monomers in the presence of amounts of a hindered piperidine derivative and a carboxylic acid chain regulator sufficient to form a polyamide polymer having at least about 30 percent amino end groups comprised of secondary or tertiary amines.

According to one embodiment of the present invention, there is provided a polyamide polymer having a high amino end group (AEG) content, wherein at least about 30 percent or greater, and preferably at least about 50 percent or greater, of the amino end groups are comprised of secondary or tertiary amines, wherein the polyamide polymer comprises the polymerization reaction product of polyamide-forming monomers in the presence of a hindered piperidine derivative and a carboxylic acid chain regulator, and wherein the hindered piperidine derivative has the following Formula I:

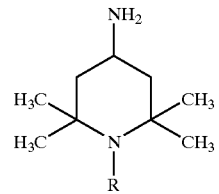

Formula I in which R represents a hydrogen atom, hydrocarbon groups having from 1 to 20 carbon atoms, alkyl groups having from 1 to 18 carbon atoms, or a benzyl group.

The present invention also embodies a dyeing process comprising dyeing a fibrous article with a coloring agent, said fibrous article comprising a polyamide polymer having a amino end group content, wherein at least about 30 percent or greater, and more preferably at least about 50 percent or greater, of the amino end groups are comprised of secondary or tertiary amines.

The modified polymer of the present invention may be made by hydrolytically polymerizing polyamide-forming monomers such as, for example, epsilon-caprolactam in the presence of water, a carboxylic acid chain regulator, and a hindered piperidine derivative. Specifically, the modified polyamide polymer may be made by polymerizing epsilon-caprolactam in the presence of at least one hindered piperidine derivative of the Formula I as identified above and a carboxylic acid chain terminator.

The hindered piperidine derivative is preferably an aminopolyalkylpiperidine. Exemplary hindered piperidine derivatives include:

4-amino-2,2',6,6'-tetramethylpiperidine;
4-(aminoalkyl)-2,2',6,6'-tetramethylpiperidine;
4-(aminoaryl)-2,2',6,6'-tetramethylpiperidine;
4-(aminoaryl/alkyl)-2,2',6,6'-tetramethylpiperidine,
3-amino-2,2',6,6'-tetramethylpiperidine;
3-(aminoalkyl)-2,2',6,6'-tetramethylpiperidine;
3-(aminoaryl)-2,2',6,6'-tetramethylpiperidine;
3-(aminoaryl/alkyl)-2,2',6,6'-tetramethylpiperidine;
2,2',6,6'-tetramethyl-4-piperidinecarboxylic acid;
2,2',6,6'-tetramethyl-4-piperidinealkylcarboxylic acid;
2,2',6,6'-tetramethyl-4-piperidinearylcarboxylic acid;
2,2',6,6'-tetramethyl-4-piperidinealkyl/arylcarboxylic acid;
2,2',6,6'-tetramethyl-3-piperidinecarboxylic acid;
2,2',6,6'-tetramethyl-3-piperidinealkylcarboxylic acid;
2,2',6,6'-tetramethyl-3-piperidinearylcarboxylic acid;
2,2',6,6'-tetramethyl-3-piperidinealkyl/arylcarboxylic acid;
4-amino-1,2,2',6,6'-pentamethylpiperidine;
4-(aminoalkyl)-1,2,2',6,6'-pentamethylpiperidine;
4-(aminoaryl)-1,2,2',6,6'-pentamethylpiperidine;
4-(aminoaryl/alkyl)-1,2,2',6,6'-pentamethylpiperidine;
3-amino-1,2,2',6,6'-pentamethylpiperidine;
3-(aminoalkyl)-1,2,2',6,6'-pentamethylpiperidine;
3-(aminoaryl)-1,2,2',6,6'-pentamethylpiperidine;
3-(aminoaryl/alkyl)-1,2,2',6,6'-pentamethylpiperidine;
1,2,2',6,6'-pentamethyl-4-piperidinecarboxylic acid;
1,2,2',6,6'-pentamethyl-4-piperidinealkylcarboxylic acid;
1,2,2',6,6'-pentamethyl-4-piperidinearylcarboxylic acid;
1,2,2',6,6'-pentamethyl-4-piperidinealkyl/arylcarboxylic acid;
1,2,2',6,6'-pentamethyl-3-piperidinecarboxylic acid;
1,2,2',6,6'-pentamethyl-3-piperidinealkylcarboxylic acid;
1,2,2',6,6'-pentamethyl-3-piperidinearylcarboxylic acid; and
1,2,2',6,6'-pentamethyl-3-piperidinealkyl/arylcarboxylic acid.

Most preferably, the hindered piperidine derivative is 4-amino-2,2',6,6'-tetramethylpiperidine or 4-amino-1,2,2',6,6'-pentamethylpiperidine.

The hindered piperidine compound may be added to the starting monomers or to the polymerizing reaction mixture. The polymerization is preferably carried out according to conventional conditions for polymerizing polyamide 6 forming monomers to make the modified polyamide. The hindered piperidine derivative is added in an amount ranging from about 0.10 to about 0.80 weight percent, preferably from about 0.15 to about 0.50 weight percent.

The hindered piperidine derivative is chemically bonded to the backbone polymer chain of the polyamide polymer rather than being merely physically admixed with the polyamide polymer.

The hindered piperidine may be combined with at least one of the conventional chain regulators. Suitable chain regulators include, for example, monocarboxylic and dicarboxylic acids. Non-limiting examples of monocarboxylic acids include, for example, acetic acid, propionic acid, and benzoic acid. Exemplary dicarboxylic acids include the $C_4$–$C_{10}$ alkane dicarboxylic acids (e.g., cyclohexane-1,4-dicarboxylic acid), benzene and naphthalene dicarboxylic acids (e.g., isophthalic acid, terephthalic acid, and naphthalene 2,6-dicarboxylic acid), and combination thereof. Preferably, the carboxylic acid chain regulator is a dicarboxylic acid. Most preferably, the chain regulator is terephthalic acid.

The carboxylic acid chain regulator is added in an amount ranging from about 0.01 to about 0.50 weight percent. Preferably, the amount of carboxylic acid chain regulator added is between about 0.05 and about 0.40 weight percent. As discussed in greater detail below, amounts of the hindered piperidine compound and the carboxylic acid chain regulator may be adjusted so as to achieve the desired AEG content in the resulting polymer.

Water is preferably used as a polymerization initiator. The amount of water used as an initiator may vary but is typically about 0.40 weight percent based on the weight of the polyamide 6 forming monomers.

The modified polyamide 6 polymer of the present invention has an amino end group (AEG) content of greater than about 65 meq/kg. Preferably, the amino end group content is from about 75 meq/kg to about 85 meq/kg. Particular preference is given to an amino end group content of about 80 meq/kg.

By adjusting the ratio of the hindered piperidine derivative, one is able to control the amount of secondary and tertiary amines present in the modified polyamide 6 polymer of the present invention. In the modified polyamide 6 polymer of the present invention, at least about 30 percent or greater of the amino end groups should be comprised of secondary or tertiary amines, where the amine depends on the hindered piperidine derivative actually employed. Preferably, at least about 35 percent or greater of the amino end groups should be comprised of secondary or tertiary amine. Particular preference is given to the range of from about 40 to about 50 percent of the amino end groups being comprised of the secondary or tertiary amine end groups. Most preferred is where at least about 50 percent or greater of the amino end groups is comprised of secondary or tertiary amine.

Because secondary and tertiary amines are more basic than primary amines, secondary and tertiary amines are more easily protonated in water. While not wishing to be bound to a particular theory, it is believed that the secondary and tertiary amines posses a strong affinity to acid dye molecules, which results in better dye bleed performance.

Secondary amino end groups are incorporated into the polyamide 6 polymer chain by using one of the 2,2',6,6'-tetramethyl piperidines as the hindered piperidine derivative. Preferably, the source of secondary amine end groups is 4-amino-2,2',6,6'-tetramethylpiperidine. Tertiary amino end groups are incorporated into the polyamide 6 polymer chain by using one of the 1,2,2',6,6'-pentamethylpiperidines as the hindered piperidine derivative. Preferably, the source of tertiary amine end groups is 4-amino-1,2,2',6,6'-pentamethylpiperidine.

The modified polyamide 6 polymer of the present invention may be formed into various articles. Non-limiting examples of such articles include fibers, yarns, textile fabrics, and the like.

Fibers may be formed by subjecting the modified polyamide of the present invention to any conventional fiber-forming process such as, for example, that disclosed in U.S. Pat. Nos. 4,983,448 to Karageorgiou and 5,487,860 to Kent et al., both of which are incorporated herein by reference.

Similarly, fabrics may be formed by subjecting the modified polyamide of the present invention to any conventional fabric-forming process such as, for example, the one disclosed in U.S. Pat. No. 4,918,947 to Speich, the entirety of which is incorporated herein by reference.

The articles formed from the modified polymer of the present invention may be dyed with conventional dyes used to dye polyamides, for example, metallized and non-metallized acid dyes. Dyeing may occur in fiber form such as in stock dyeing of filament staple, tow, tops, or sliver. Dyeing may also occur in fabric form such as woven, non-woven, or knitted goods or in garment form. The dyestuffs are preferably non-complexed acid dyes or 1:2 metal-complexed acid dyes prepared with chrome, iron, cobalt, copper, aluminum, or any transition metal. Usual dyebath conditions for dyeing nylon can be employed.

The following general conditions are exemplary and not intended to be limiting. The articles for elastic fabric applications are typically heatset to stabilize the fabrics. Heaatsetting conditions range typically between about 182° C. to about 196° C. A dyebath is prepared at a volume equal to about twenty times the weight of the articles to be dyed. Processing chemicals are added, including a chelating agent to prevent the deposition or complexing of metal ions in hard water, a dye leveling agent, and, in the case of metallized acid dyes, an acid donor to slowly lower the dyebath pH. The dyestuff is added, and the dyebath pH is adjusted to between about 5 and about 7 for acid dyes and to between about 8 and about 10 for metallized acid dyes. The dyebath solution is heated to the desired temperature, typically between about 95° C. and about 110° C., at a rate of from about 0.5° C. to about 3.0° C. per minute and is held at that temperature for about 30 minutes to about 60 minutes. The dyebath is then cooled or emptied, and the articles are thoroughly rinsed with fresh water. The dyed articles are then dried in a tumble drier or in a vertical oven such as a Tenter or are passed over heater cans.

Other classes of dyestuffs may also be used, such as direct or reactive dyestuffs. The dyed goods are then aftertreated with a synthetic tanning or fixing agent (Syntan) to assist in fixing the dyestfuffs. The Syntan can be either anionic, cationic or a mixture thereof. The Syntans can also be applied during the end of the dyeing or in a fresh treatment bath after dyeing. A commercial Syntan can be, for example, Mesitol™ NBS. The dyed goods can then be optionally post-heatset to improve dimensional stability and wet fastness properties.

Exemplary dyes useful in the practice of the present invention include acid dyes such as the following Color Index (C.I.) dyes: Acid Yellows 24, 40, 59, 159, 184, 204 and 246, Acid Oranges 142 and 156, Acid Reds 50, 51, 52, 138, 151, 299, 361, 362, Acid Greens 104 and 108, Acid Blues 113, 171, 185, 193, 277 and 324, Acid Violet 90, Acid Brown 298, Acid Blacks 52, 131:1, 132:1, 172, 187 and 194. In addition, the following non-Color Index dyes may be employed: Lanaset Blue 2R, Lanaset Navy R, Lanaset Red G, Lanaset Red 2GA, Lanaset Violet B, Lanaset Brown B, Burconyl Brick Red AF-3b, Burconyl Rubine AF-GR, Burconyl Orange AF-3R, Burconyl Green AF-B, Burconyl Brilliant Blue AF-R, Burconyl Royal Blue AF-R, Burconyl Brilliant Yellow AF-4G, Erionyl Red A-3G, Erionyl Blue RL 200, and Nylanthrene Brilliant Blue 2RFF.

The invention will be further described by reference to the following detailed examples. The examples are set forth by way of illustration and are not intended to limit the scope of the invention. All percentages are percentages by weight unless otherwise noted. In the following examples, the test procedures described below are used to measure the stated properties.

Amino End Group Content: The amino end group content is determined by dissolving about 2.0 g of the polymer in about 60 ml of a phenol-methanol mixture (68:32). This solution is titrated with about 0.02 normal HCl at about 25° C. by a potentiometric method, wherein the endpoint is determined by a steep potential increase.

Carboxylic End Group Content: The carboxylic end group content is determined by dissolving 0.30 g of the polymer in about 40 ml of benzyl alcohol at 180° C. The solution is titrated with about 0.03 normal t-butyl ammonium hydroxide at 80° C. to about 100° C. by a potentiometric method, wherein the endpoint is determined by a steep potential increase.

Relative Viscosity: The relative viscosity compares the viscosity of a solution of polymer in formic acid with the viscosity of formic acid itself (ASTM D789). The test results reported are obtained using 0.20 g of nylon 6 dissolved in 20 mL of formic acid at 25° C.

Colorfastness to Water Bleeding: This test assesses the propensity of dyed materials to transfer dye to undyed adjacent textiles under wet ambient conditions. In this regard, a 2"×6" dyed test sample is cut from the dyed fabric to be tested. An undyed test sample measuring 2"×6" of scoured white 100% nylon fabric is also prepared. The dyed and undyed test samples are fully saturated with deionized water. The wet undyed test sample is placed physically on top of the dyed test sample and both test samples are rolled into a "cigar" with the undyed test sample on the inside. The "cigar" is then placed in a closed vial at room temperature (24+/−3° C.) for 24 hours. The "cigar" is thereafter removed from the vial and unrolled so as to separate the dyed and undyed test samples from one another. Each of the dyed and undyed test samples are laid flat on a non-absorbent surface and allowed to dry. When dry, the dye bleed on the side of the undyed test sample that was in contact with the dyed test sample when rolled in the "cigar" is then rated using the AATCC Color Transference Scale.

Colorfastness to Laundering: AATCC Test Method 61-1966, Option 2A, Colorfastness to Laundering, Home and Commercial: Accelerated. A dyed knitted tube of double thickness is used. Samples were rated by the staining of the nylon fiber in a multi-fiber test swatch.

Colorfastness to Perspiration: AATCC Test Method 15-1997, Option 2A, Colorfastness to Laundering, Home and Commercial: Accelerated. A dyed, knitted tube of double thickness is used. Samples were rated by the staining of the nylon fiber in a multi-fiber test swatch.

Color Measurements: Color measurements are made using a Datacolor Systems Spectrophotometer generating 1976 CIE LAB (D6500 illuminant, 10 degree observer) values. Delta E (ΔE, total color difference) calculations are made against unexposed controls. Details of CIE LAB measurements and calculation of total color difference (ΔE) are found in the color science literature, for example, Billmeyer et al, *Principles of Color Technology*, $2^{nd}$ Edition.

EXAMPLE 1 (COMPARATIVE)

A mixture of 75 kg of caprolactam, 1800 g of water, 412.5 g (0.55 weight percent) terephthalic acid, and 217.5 g (0.29 weight percent) 4-amino-2,2',6,6'-tetramethylpiperidine is charged into a 250-liter autoclave. The mixture is heated to 270° C. in one hour while the pressure increases to 60 psi (3102 mm Hg). After holding the mixture at 60 psi (3,102 mm Hg) for 30 minutes, the pressure is slowly released. To accelerate the polymerization, the system is placed under a vacuum of 500 mm Hg for 30 minutes. The polymer is then extruded under a positive nitrogen pressure and cut into chips. The chips are washed with hot water (90° C.) and dried in a tumble dryer. The relative viscosity measured 2.42. The amino group content measures 44.2 meq/kg, and carboxylic end group content measures 79 meq/kg.

EXAMPLE 2

A mixture of about 75 kg of caprolactam, about 1800 g of water, about 300 g (0.40 weight percent) terephthalic acid, and about 390 g (0.52 weight percent) 4-amino-2,2,6,6-tetramethylpiperidine is charged into a 250-liter autoclave. The mixture is heated to 270° C. in one hour while the pressure increases to about 60 psi (3102 mm Hg). After holding the mixture at that pressure for about 30 minutes, the pressure is slowly released. To accelerate the polymerization, the system is placed under a vacuum of about 500 mm Hg for about 15 minutes. The polymer is then extruded under a positive nitrogen pressure and cut into chips. The chips are washed with hot water (90° C.) and dried in a tumble dryer. The relative viscosity measures 2.37. The amino group content measures 74.8 meq/kg, and carboxylic end group content measures 60 meq/kg.

EXAMPLE 3

A mixture of about 75 kg of caprolactam, about 1800 g of water, about 69 g (0.092 weight percent) terephthalic acid, and about 217.5 g (0.29 weight percent) 4-amino-2,2',6,6'-tetramethylpiperidine is charged into a 250-liter autoclave. The mixture is heated to 270° C. in one hour while the pressure increases to about 60 psi (3102 mm Hg). After holding the mixture at that pressure for about 30 minutes, the pressure is slowly released. To accelerate the polymerization, the system is placed under a vacuum of about 650 mm Hg without holding time. The polymer is then extruded under a positive nitrogen pressure and cut into chips. The chips are washed with hot water (90° C.) and dried in a tumble dryer. The relative viscosity measures 2.34. The amino end group content measures 87.7 meq/kg, and carboxylic end group content measures 57 meq/kg.

EXAMPLE 4

A mixture of about 75 kg of caprolactam, about 1800 g of water, about 232.5 g (0.31 weight percent) terephthalic acid, and about 472.5 g (0.63 weight percent) 4-amino-2,2,6,6-tetramethylpiperidine is charged into a 250-liter autoclave. The mixture is heated to 270° C. in one hour while the pressure increases to about 60 psi (3102 mm Hg). After holding the mixture at that pressure for 30 minutes, the pressure is slowly released. To accelerate the polymerization, the system is placed under a vacuum of about 500 mm Hg for about 20 minutes. The polymer is then extruded under a positive nitrogen pressure and cut into chips. The chips are washed with hot water (90° C.) and dried in a tumble dryer. The relative viscosity measures 2.31. The amino group content measures 93.3 meq/kg, and carboxylic end group content measures 45 meq/kg.

A. Yarn Production

The polymers of Examples 1–4 above were melt-spun into yarns having the properties noted in the following Table A:

TABLE A

| | Yarn Properties | | | | | | | |
|---|---|---|---|---|---|---|---|---|
| | Yarn Chemical Properties | | | | Yarn Physical Properties | | | |
| | | | | | | Initial | | |
| | RV | AEG meq/kg | CEG meq/kg | MS % | Elong. % | Tenacity gm/denier | Modulus gm/denier | BWS % |
| Ex. 1 | 2.39 | 40.1 | 75 | 1.66 | 54 | 4.80 | 15.9 | 8.7 |
| Ex. 2 | 2.32 | 67.6 | 52 | 1.42 | 52 | 4.52 | 15.7 | 8.4 |
| Ex. 3 | 2.32 | 76.6 | 49 | 1.89 | 52 | 4.14 | 15.2 | 7.8 |
| Ex. 4 | 2.29 | 85.3 | 44 | 1.74 | 52 | 4.48 | 15.2 | 8.2 |

B. Yarn Dyeing

The yarns formed of the polymers of Examples 1–4 are knitted into tubes and dyed four shades as described below in Examples. Because of their high dyestuff concentrations these shades represent some of the fashion shades with typically poor wet fastness properties on polyamide-6 fibers.

Example 1A (Red)

A dye bath of the following formulation was used in this Example:

15:1 bath ratio, demineralized water.

1.00/a Uniperol NB-SE® (anionic leveling agent commercially available from BASF Corporation, Charlotte, N.C.)

2.0% Ammonium Sulfate 2.00/o Intracid™ Rhodamine B (C.I. Acid Red 52)

2.0% Intrazone™ Red G 190%

(Intracid™ and Intrazonemi™ dyestuffs are commercially available from Crompton & Knowles Colors Inc., Charlotte, N.C.)

The bath pH is adjusted to 3.5 with acetic acid. Samples are heated to 980° C. at 3° F./min. and held for 45 minutes. Samples are rinsed in cool water.

Example 2A (Plum Shade)

A dye bath of the following formulation was used in this Example:

15:1 bath ratio, demineralized water 1.00/a Uniperol NB-SE®

0.25 g/l Trisodium Phosphate 2.0 g/l Sandacid® VS (acid donor commercially available from Clariant Corporation, Charlotte, N.C.)

0.387% (owf) Telon™ Blue BRL 200

1 0.8800/s (owf) Telon™ Fast Rubine A5BLW
0.0500/a (owf) Nylanthrene™ Yellow FLW
(Telon™ dyestuffs are commercially available from Dystar L.P., and Nylanthrene™ dyestuffs from Crompton & Knowles Colors Inc., both in Charlotte, N.C.)

The bath pH is adjusted to 3.5 with acetic acid. Samples are heated to 980° C. at 3° F./min. and held for 45 minutes. Samples are rinsed in cool water.

Example 3A (Dark Green)

15:1 bath ratio, demineralized water
3.0 g/L Eulysin® NB-SOS
0.5 g/L Soda Ash
0.38% Telon™ Fast Yellow A3GL 200
0.300/o Nylomine™ Red C-2B
0.72% Nylosan™ Navy N-RBL
(Nylomine™ dyestuffs are commercially available from D & G Dyes, Greenville, S.C. and Nylosan™ dyestuffs from Clariant Corp., Charlotte, N.C.)

The bath pH is not adjusted but starts at pH 8–9 and is lowered by the acid donor during the dyeing. Samples are heated to 980° C. at 3° F./min. and held for 45 minutes. Samples are rinsed in cool water.

Example 4A (Navy Blue)

15:1 bath ratio, demineralized water
3.0 g/L Eulysin® NB-505 (acid donor commercially available from BASF Corporation, Charlotte, N.C.)
0.5 g/L Soda Ash
0.52% Supranol™ Yellow 4GL
0.25% Nylanthrene™ Rubine 5BLF
1.25% Nylomine™ Green GHN
(Supranol™ dyestuffs are commercially available from Dystar L.P., and Nylanthrene™ dyestuffs from Crompton & Knowles Colors Inc., both in Charlotte, N.C. and Nylomine™ dyestuffs are commercially available from D & G Dyes, Greenville, S.C.)

The bath pH is not adjusted but starts at pH 8–9 and is lowered by the acid donor during the dyeing. Samples are heated to 980° C. at 3° F./min. and held for 45 minutes. Samples are rinsed in cool water.

C. Aftertreatment

Each sample from Examples 1A through 4A above is aftertreated separately in a fresh bath by the following procedure:

15:1 bath ratio, demineralized water.
2.0% Mesitol™ NBS (powder, predissolved in very hot water).
The pH is adjusted to 5.0 with acetic acid.
Samples are heated to 770° C. at 3–4° F./min. and held for 30 minutes.
Samples are rinsed in cool water.

D. Results

Figure 1B:
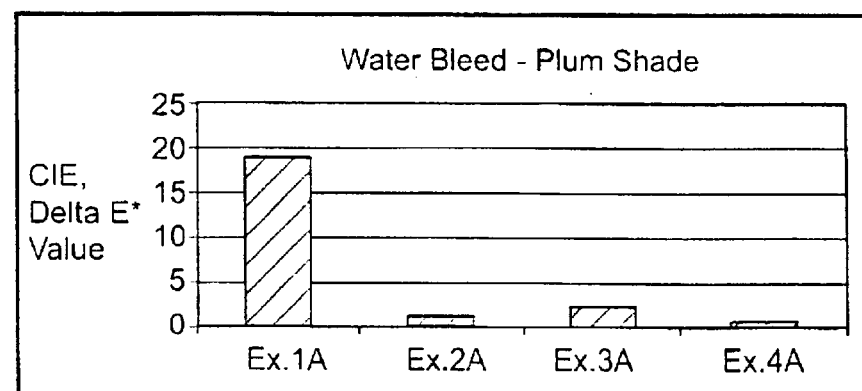
Figure 1C:
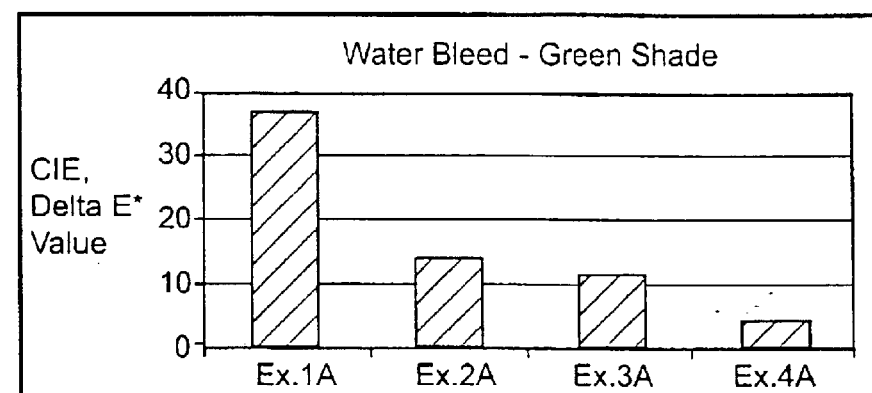
Figure 1D:
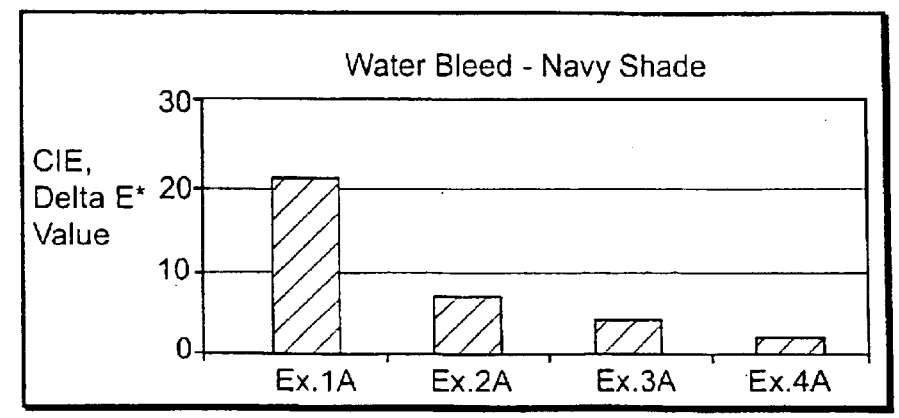
Figure 2A:
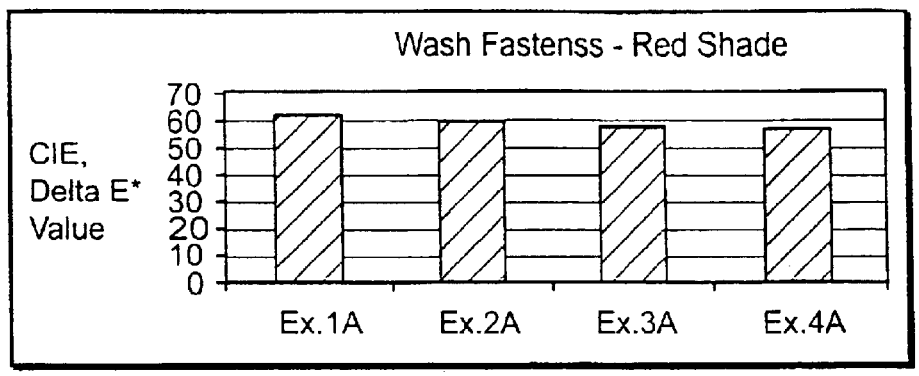
FIGS. 2A–2D are graphical presentations of the Wash Fastness data obtained from the dyed samples of Examples 1A–4A, respectively.
Figure 2B:
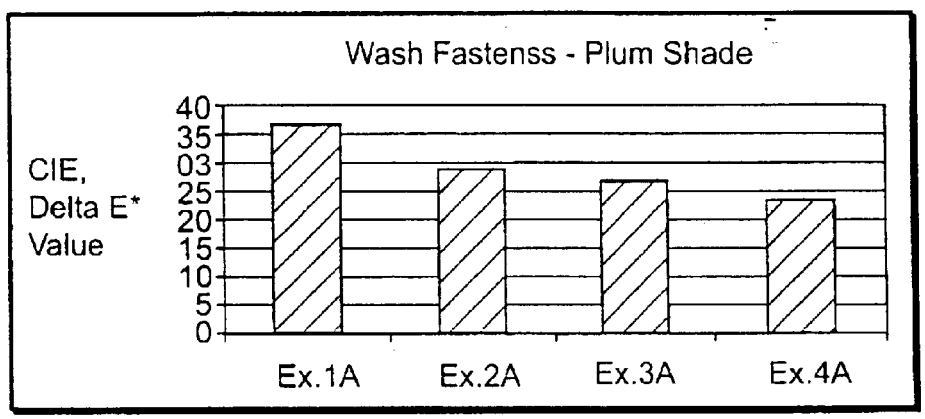
Figure 2C:
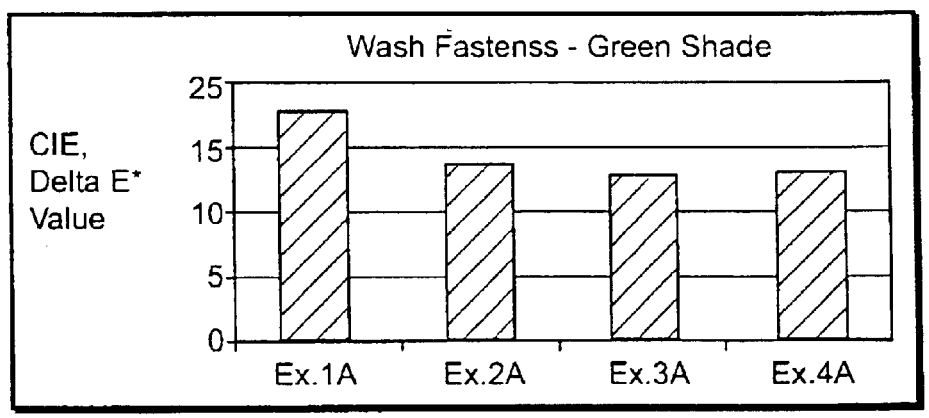
Figure 2D:
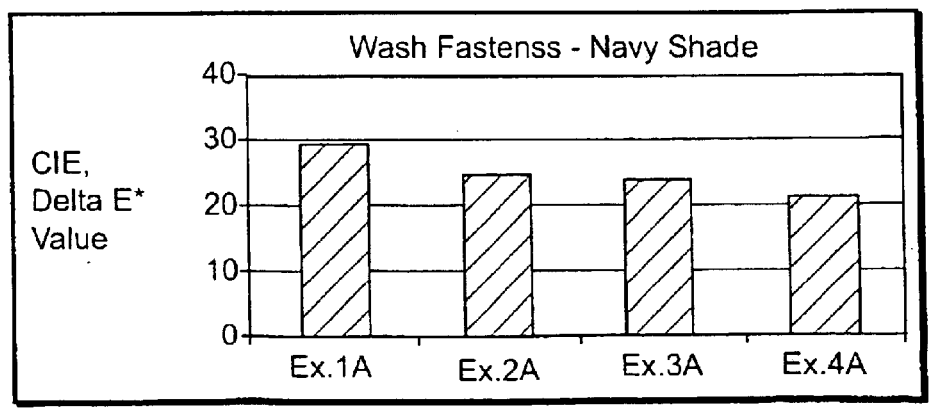
Figure 3A:
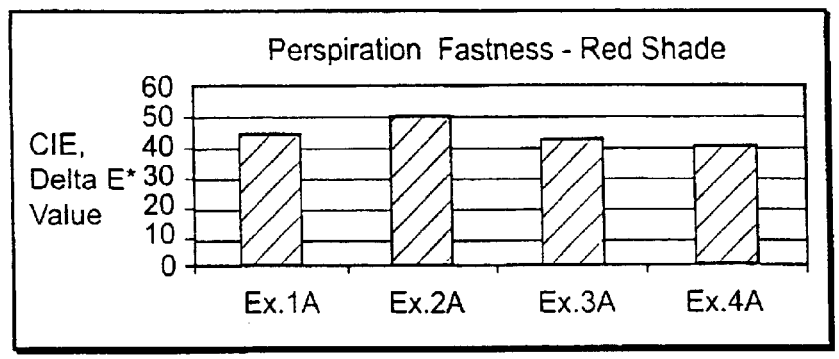
FIGS. 3A–3D are graphical presentations of the Perspiration Fastness data obtained from the dyed samples of Examples 1A–4A, respectively.
Figure 3B:
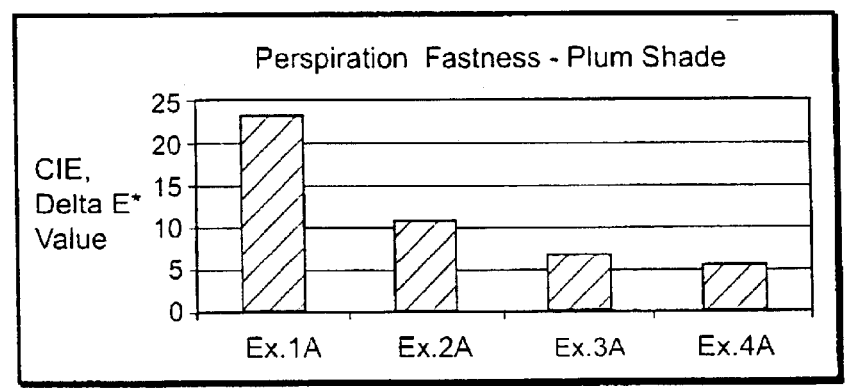
Figure 3C:
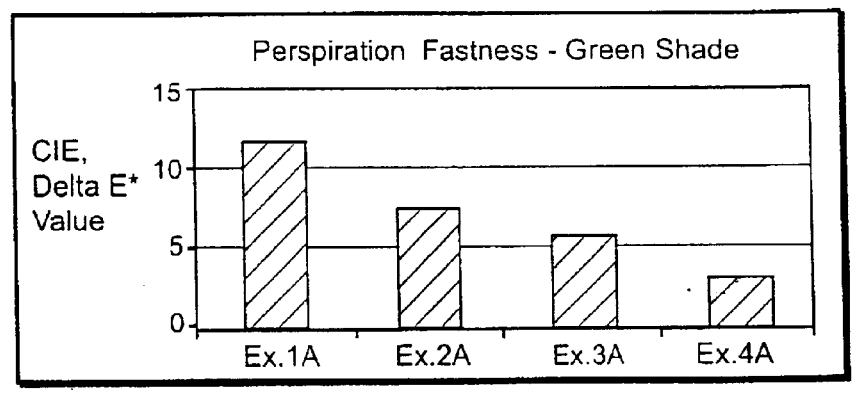
Figure 3D:
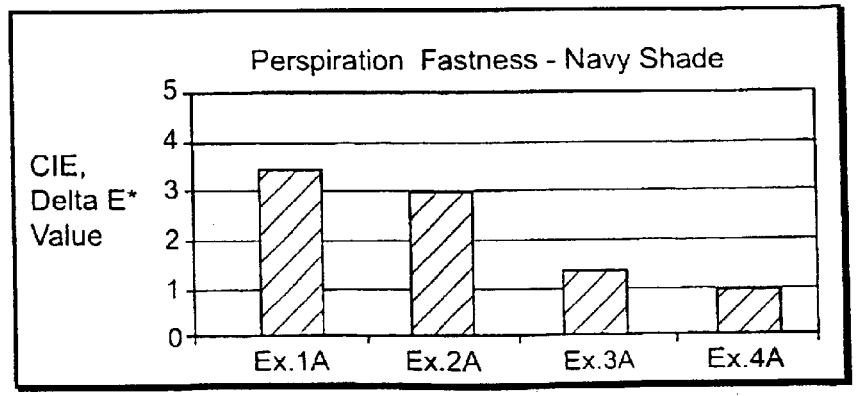

Each of the dyed and aftertreated samples is then tested for Colorfastness to Water Bleeding (Water Bleed), Colorfastness to Laundering (Wash Fastness) and Colorfastness to Perspiration (Perspiration Fastness). The results are depicted graphically in the accompanying FIGS. 1A–1D, 2A–2D and 3A–3D, respectively.

The data show significant improvement dye bleed performances relative to conventional polyamide 6 yarns. Accordingly, while the invention has been described in connection with what is presently considered to be the most practical and preferred embodiment, it is to be understood that the invention is not to be limited to the disclosed embodiment, but on the contrary, is intended to cover various modifications and equivalents arrangements included within the spirit and scope of the appended claims.

What is claimed is:

1. A process for preparing a wetfast dyed polyamide fiber comprising the steps of
   (a) presenting to a dyebath a fiber which is formed of a polyamide polymer having a high amino end group content which is comprised of the polyamide polymerization reaction product of polyamide-forming monomers in the presence of between about 0.50 to about 0.80 weight percent of a hindered piperidine derivative and between about 0.05 to about 0.40 weight percent of a carboxylic acid chain regulator sufficient to form a polyamide polymer having at least about 65 percent amino end groups comprised of secondary or tertiary amines; and
   (b) in the dyebath, dyeing the polyamide fiber with one or more dyestuffs to obtain a dyed polyamide fiber which exhibits better wetfast properties, including improved resistance to dye bleeding in water and improved colorfastness to laundering, as compared to a fiber formed of a polyamide polymer having a content of secondary or tertiary amino end groups of less than about 65 percent.

2. The process of claim 1, wherein the hindered piperidine derivative has the following formula I:

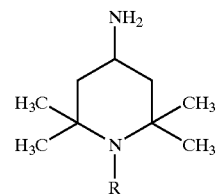

in which R represents a hydrogen atom, hydrocarbon groups having from 1 to 20 carbon atoms, alkyl groups having from 1 to 18 carbon atoms, or a benzyl group.

3. The process of claim 1 or 2, wherein the carboxylic chain regulator is at least one selected from the group consisting of acetic acid, propionic acid, benzoic acid, cyclohexane-1,4-dicarboxylic acid, isophthalic acid, terephthalic acid, naphthalene 2,6-dicarboxylic acid, and combinations thereof.

* * * * *